US012619453B2

(12) United States Patent
Tsuchiya et al.

(10) Patent No.: US 12,619,453 B2
(45) Date of Patent: May 5, 2026

(54) COMMUNICATION PROCESSING DEVICE, PROGRAM AND COMMUNICATION PROCESSING METHOD

(71) Applicant: YOKOGAWA ELECTRIC CORPORATION, Musashino (JP)

(72) Inventors: Masanobu Tsuchiya, Musashino (JP); Yoshitaka Yoshida, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 749 days.

(21) Appl. No.: 17/204,048

(22) Filed: Mar. 17, 2021

(65) Prior Publication Data

US 2021/0303329 A1 Sep. 30, 2021

(30) Foreign Application Priority Data

Mar. 30, 2020 (JP) ................................. 2020-061242

(51) Int. Cl.
*G06F 9/455* (2018.01)
*G06F 9/48* (2006.01)
(52) U.S. Cl.
CPC .......... *G06F 9/45558* (2013.01); *G06F 9/485* (2013.01); *G06F 2009/4557* (2013.01);
(Continued)
(58) Field of Classification Search
None
See application file for complete search history.

(56) References Cited

U.S. PATENT DOCUMENTS

| | | | | |
|---|---|---|---|---|
| 2009/0292858 A1* | 11/2009 | Lambeth | ............. | G06F 9/45558 |
| | | | | 711/6 |
| 2012/0144391 A1* | 6/2012 | Ueda | ................... | G06F 9/45558 |
| | | | | 718/1 |

(Continued)

FOREIGN PATENT DOCUMENTS

| | | |
|---|---|---|
| JP | 2014-106587 A | 6/2014 |
| JP | 2014-526083 A | 10/2014 |

(Continued)

OTHER PUBLICATIONS

Takano et al. (Ninja Migration: An Interconnect-transparent Migration for Heterogeneous Data Centers, 2013, 2013 IEEE 27th International Symposium on Parallel & Distributed Processing Workshops and PhD Forum, pp. 992-1000 (Year: 2013).*

(Continued)

*Primary Examiner* — Kenneth Tang
*Assistant Examiner* — Melissa A Headly
(74) *Attorney, Agent, or Firm* — WHDA, LLP

(57) ABSTRACT

Provided is a communication processing device capable of preventing, by using a link-down function of a virtual NIC, communication frames that were in the process of being transmitted prior to pause of a virtual machine from being transmitted. The disclosed communication processing device 100 has a virtualization unit 10 that provides operating environment of virtual machines 20-1 and 20-2. The virtualization unit 10 includes a processing unit 11, the virtual machines 20-1 and 20-2 include virtual NICs 24-1, 24-2-1 and 24-2-2, and when the virtual machines 20-1 and 20-2 are paused, the processing unit 11 links down the virtual NICs 24-1, 24-2-1 and 24-2-2 of the virtual machines 20-1 and 20-2 paused.

7 Claims, 2 Drawing Sheets

(52) U.S. Cl.
CPC .............. *G06F 2009/45575* (2013.01); *G06F 2009/45595* (2013.01)

(56) References Cited

U.S. PATENT DOCUMENTS

| | | | | |
|---|---|---|---|---|
| 2016/0330245 | A1* | 11/2016 | Bell | .................... H04L 63/0823 |
| 2017/0116085 | A1* | 4/2017 | Arroyo | ............... G06F 11/3027 |
| 2020/0328989 | A1* | 10/2020 | Lambeth | ............. G06F 9/45558 |

FOREIGN PATENT DOCUMENTS

| | | |
|---|---|---|
| JP | 2014-225302 A | 12/2014 |
| JP | 2015-153298 A | 8/2015 |
| JP | 2015-197874 A | 11/2015 |
| JP | 6337498 B2 | 6/2018 |
| WO | 2009/142826 A1 | 11/2009 |
| WO | 2013/002936 A1 | 1/2013 |
| WO | WO-2020158444 A1 * | 8/2020 ......... H04L 41/0897 |

OTHER PUBLICATIONS

Office Action dated Feb. 6, 2024, issued in counterpare CN application No. 202110296945.2 with English translatin. (11 pages).

Office Action dated Jul. 31, 2024, issued in counterpart CN Application No. 202110296945.2, with English translation. (12 pages).

Office Action dated May 9, 2024, issued in counterpart CN application No. 202110296945.2, with English translation. (11 pages).

* cited by examiner

*FIG. 1*

COMMUNICATION PROCESSING DEVICE, PROGRAM AND COMMUNICATION PROCESSING METHOD

CROSS-REFERENCE TO RELATED APPLICATION

The present application claims priority to and benefit of Japanese Patent Application No. 2020-061242 filed on Mar. 30, 2020, the entire contents of which are incorporated herein by reference.

TECHNICAL FIELD

The present disclosure relates to a communication processing device, a program and a communication processing method.

BACKGROUND

In recent years, control communication by using virtualization technology is increasing in the process control system.

As the virtualization technology. Patent Literature (PTL) 1 discloses a technology of linking down a virtual Network Interface Card (NIC) so that unauthorized communication frames will not be transmitted to the outside when a virtual machine is infected with a virus.

CITATION LIST

Patent Literature

PLT 1: JP6337498 (B2)

SUMMARY

A communication processing device according to some embodiments is a communication processing device including a virtualization unit that provides operating environment of a virtual machine, in which the virtualization unit includes a processing unit, the virtual machine includes a virtual NIC, and when the virtual machine is paused, the processing unit links down the virtual NIC of the virtual machine paused.

A program according to some embodiments causes a computer to function as the communication processing device.

A communication processing method according to some embodiments is a communication processing method using a communication processing device in which a virtual machine operates, the method including a step of, when the virtual machine is paused, linking down a virtual NIC of the virtual machine paused.

BRIEF DESCRIPTION OF THE DRAWINGS

In the accompanying drawings:

FIG. 1 is a diagram illustrating a communication processing device according to an embodiment of the present disclosure.

DETAILED DESCRIPTION

Figure 2:
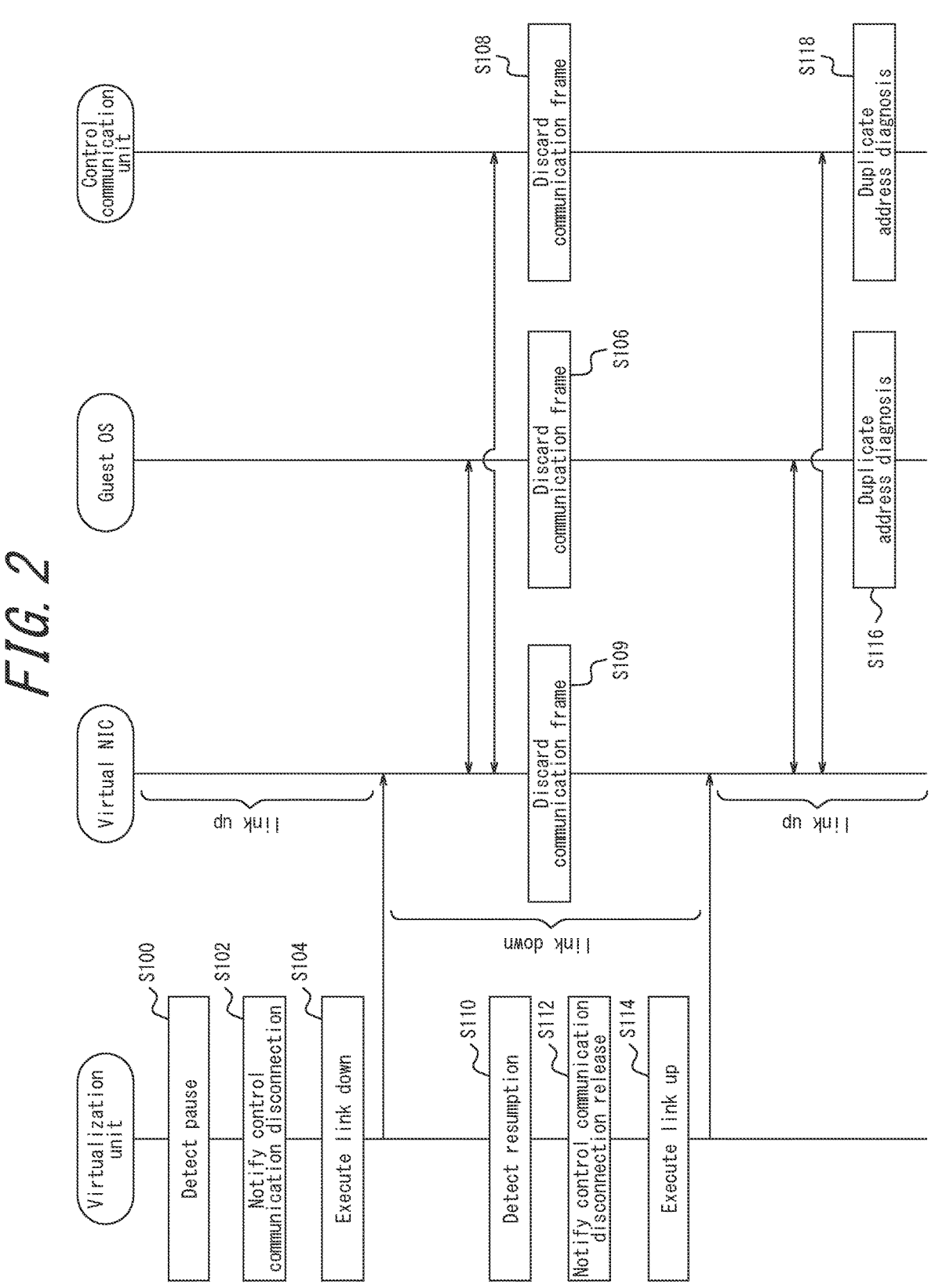
FIG. 2 is a diagram illustrating a communication processing method according to an embodiment of the present disclosure.

A virtual machine may be paused when a backup is acquired online or when a system administrator makes an operational error. Further, when detecting an abnormality in a computer or itself the virtualization unit may pause a virtual machine in order to protect processing and data inside the virtual machine. Examples of abnormality include, for example, the case where hardware such as computer storage or a physical NIC fails, the processing load of the virtualization unit increases due to concentration of accesses from other computers. When the virtual machine is paused, all the functions inside the virtual machine are paused causing the following problems.

When resuming from pause, the virtual machine resumes transmission of communication frame that were in the process of being transmitted prior to the pause. However, if the time from pause to resumption is long, there may be the case where communication frames that were in the process of being transmitted prior to pause may be things of the past and should not be transmitted. In the control communication, a real-time property is required to communicate between a control device and a computer without delay. Thus, if old communication frames that have become things of the past are transmitted, it may lead to wrong decisions based on the old device information or wrong operations based on the old operation instructions.

Asa countermeasure, if the link-down function of the virtual NIC can be used, as in PTL 1, when the virtual machine is paused, for example, the old unauthorized communication frames and the communication frames that were in the process of being transmitted prior to the pause of the virtual machine are discarded. However, with the technology of PTL 1, the inside of the virtual machine cannot recognize the pause of the virtual machine in the first place. Therefore, when the virtual machine is paused, the link-down function of the virtual NIC cannot be used, and the above-described problem cannot be solved.

It is therefore an object of the present disclosure to provide a communication processing device, a program and a communication processing method that can prevent, by using the link-down function of the virtual NIC, communication frames that were in the process of being transmitted prior to pause of the virtual machine from being transmitted.

The communication processing device according to some embodiments is a communication processing device including a virtualization unit that provides operating environment of the virtual machine, in which the virtualization unit includes a processing unit, the virtual machine includes a virtual NIC, and when the virtual machine is paused, the processing unit links down the virtual NIC of the virtual machine paused.

In this manner, even if the virtual machine is resumed from pause, since the virtual NIC is linked down, communication frames that were in the process of being transmitted prior to pause of the virtual machine is prevented from being transmitted.

In an embodiment, the processing unit may perform link-down to the virtual NIC that is responsible for control communication.

In this manner, since link-down is performed to the virtual NIC that is responsible for control communication, in general-purpose communication other than the control communication, the logical communication channel is not disconnected and communication continues.

In an embodiment, when the virtual machine is resumed, the processing unit may link up the virtual NIC of the virtual machine resumed.

In this manner, even if the virtual machine is resumed from pause, since the virtual NIC is linked up, the communication setting of the virtual machine is initialized, and control communication is prevented from being interfered with by duplicate IP addresses, etc.

In an embodiment, the processing unit may wait for a predetermined time after the virtual machine is resumed, and perform the link-up.

In this manner, link-up is not performed immediately even if the virtual machine is resumed from pause, thus the time required for initialization of communication setting and preparation of re-establishment of control communication can be sufficiently secured.

In an embodiment, the processing unit may perform the link-up to the virtual IC that is responsible for control communication.

In this manner, link-up is performed only to the virtual NIC that is responsible for control communication, thus, in general-purpose communication other than the control communication, a logical communication channel is not disconnected and communication continues.

A program according to some embodiments causes a computer to function as the communication processing device.

In this manner, even if the virtual machine is resumed from pause, the virtual NIC is linked down, thus communication frames that were in the process of being transmitted prior to pause of the virtual machine is prevented from being transmitted.

A communication processing method according to some embodiments is a communication processing method using a communication processing device in which a virtual machine operates, the method including a step of, when the virtual machine is paused, linking-down a virtual NIC of the virtual machine paused.

In this manner, even if the virtual machine is resumed from pause, since the virtual IC is linked down, communication frames that were in the process of being transmitted prior to pause of the virtual machine are prevented from being transmitted.

In an embodiment, the method may further include a step of, when the virtual machine is resumed, linking up a virtual NIC of the virtual machine resumed.

In this manner, even if the virtual machine is resumed from pause, the virtual NIC is linked up. Thus the communication setting of the virtual machine is initialized, and control communication is prevented from being interfered with by duplicate IP addresses, etc.

According to the present disclosure, a communication processing device, a program and a communication processing method that can prevent, with the use of a link-down function of the virtual NIC, communication frames that were in the process of being transmitted prior to pause of the virtual machine from being transmitted can be provided.

Embodiments of the present disclosure will be described below with reference to the drawings. In each drawing, the same reference signs indicate the same or equivalent components.

(Communication Processing Device)

Figure 1:
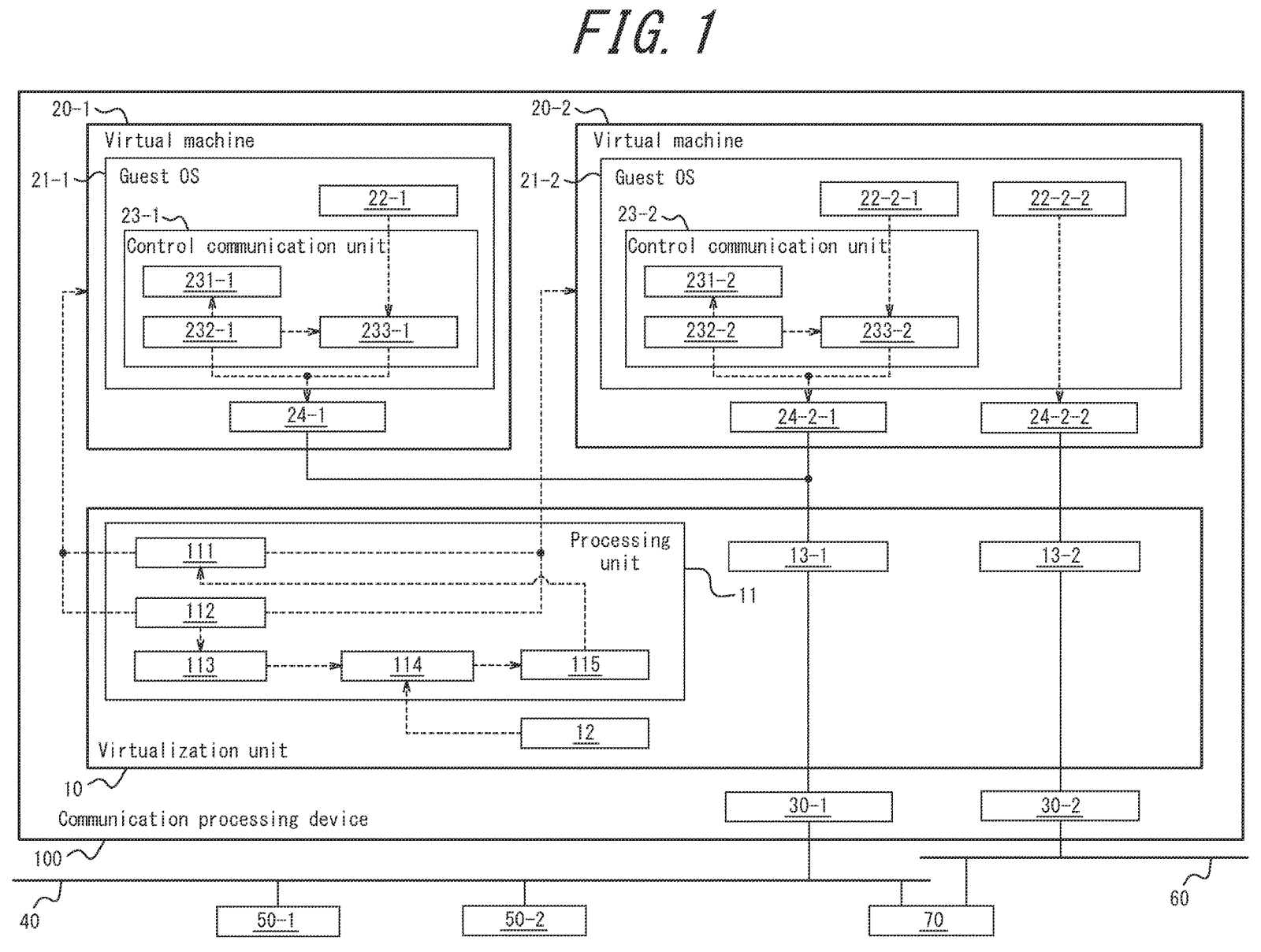

Configuration of a communication processing device 100 according to an embodiment will be described with reference to FIG. 1.

The communication processing device 100 includes at least a virtualization unit 10 configured to provide operating environment of one or more virtual machines 20-1 and 20-2, realized by using any virtualization technology.

The communication processing device 100 includes physical NICs 30-1 and 30-2 having any communication interface function. The communication processing device 100 is connected, via the physical NIC 30-1, to a control network 40 to which controllers 50-1 and 50-2 are connected. Further, the communication processing device 100 is connected, via the physical NIC 30-2, to a general-purpose network 60 that is responsible for communication other than the control communication. Any external computer 70 is connected to the control network 40 and the general-purpose network 60. In the external computer 70, any application to control the controllers 50-1 and 50-2, any application to instruct and monitor the communication processing device 100, or any application for general-purpose communication operates. One or more field devices are connected to the controllers 50-1 and 50-2, and a plant is controlled by controlling the field device. The field device is, for example, a sensor such as a flow meter, a thermometer, a hygrometer, or a pressure gauge, or a device such as a valve, a pump, or an actuator. It is to be noted that any number of communication processing devices 100, controllers 50-1 and 50-2 and the external computers 70 may be used.

Various operations of the communication processing device 100 is realized by executing the program stored in any physical memory included in a computer, by any physical processor included in the computer.

The virtual machines 20-1 and 20-2 include virtual NICs 24-1, 24-2-1 and 24-2-2 realized by using any virtualization technology. Any guest Operating Systems (OS)21-1 and 21-2 are operated on the virtual machines 20-1 and 20-2. Application units 22-1, 22-2-1 and 22-2-2 and control communication units 23-1 and 23-2 are operated on the guest OSs 21-1 and 21-2. Examples of the guest OSs 21-1 and 21-2 include, for example, general-purpose OSs such as Windows® or Linux. It is to be noted that any number of application units 22-1, 22-2-1 and 22-2-2 may be used.

The Application units 22-1 and 22-2-1 operate software relating to any application for controlling a plant and controllers 50-1 and 50-2, for example. Examples of software include, for example, a Human Machine Interface (HMI) that displays measurement data of a plant and operates the plant, an Engineering Server (ENG) that creates control programs of the controllers 50-1 and 50-2, gateways and software relating to applications such as controllers 50-1 and 50-2. On the other hand, the application unit 22-2-2 operates software relating to any application for general-purpose communications.

The control communication units 23-1 and 23-2 perform control communication such as Vnet/IP communication on the basis of communication requests from the application units 22-1 and 22-2-1. Specifically, the control communication units 23-1 and 23-2 notify the controllers 50-1 and 50-2 or the external computer 70 of the communication requests from the application units 22-1 and 22-2-1 via virtual NICs 24-1 and 24-2-1, a virtual L2SW 13-1, a physical NIC 30-1 and the control network 40. It is to be noted that the control communication is used in a process control system, and is required to have real-time property for performing various communications without delay. The "real-time property" means that a communication request made by the control communication units 23-1 and 23-2 to the controllers 50-1 and 50-2 or the external computer 70 is completed within a predetermined time, or that even if the communication request is not completed within a predetermined time, a response such as an error notification is returned to the control communication units 23-1 and 23-2 within a predetermined time. The control communication units 23-1 and 23-2 include, for example, communication channel establishment units 231-1 and 231-2, link state detectors 232-1 and 232-2 and frame transmitters 233-1 and 233-2.

The link state detectors 232-1 and 232-2 monitor the link state of the virtual NICs 24-1 and 24-2-1. When detecting a change in the link state, the link state detectors 232-1 and 232-2 notify the communication channel establishment units 231-1 and 232-2 and the frame transmitters 233-1 and 233-2 of the link state of the virtual NICs 24-1 and 24-2-1. When the link-up state or the link-down state of the virtual NICs 24-1 and 24-2-1 continues for a certain period of time, the link state detectors 232-1 and 232-2 notify the communication channel establishment units 231-1 and 231-2 and frame transmitters 233-1 and 233-2 of the link state of the virtual NICs 24-1 and 24-2-2.

When detecting link-up of the virtual NICs 24-1 and 24-2-1 through the notification from the link state detectors 232-1 and 232-2, the communication channel establishment units 231-1 and 231-2 establish a logical communication channel (e.g., a Transmission Control Protocol (TCP) connection or opening of a User Datagram Protocol (UDP) port, and upper layer protocol negotiation using UDP) with the controllers 50-1 and 50-2 and the external computer 70 connected to the control network 40. It is to be noted that, when establishing a communication channel, the communication channel establishment units 231-1 and 231-2 perform Internet Protocol (IP) address assignment, routing setting, and the like. When assigning an IP address, the communication channel establishment units 231-1 and 231-2 perform duplicate IP addresses diagnosis so that the IP address of each device will not be duplicated on the control network 40. It is to be noted that the guest OSs 21-1 and 21-2 may be responsible for some or all of the processes such as IP address assignment, routing setting, and duplicate IP addresses diagnosis. On the other hand, when detecting link-down of the virtual NICs 24-1 and 24-2-1 through a notification from the link state detectors 232-1 and 232-2, the communication channel establishment units 231-1 and 231-2 perform IP address release, routing setting, and the like to disconnect the logical communication channel with the controllers 50-1 and 50-2 and the external computer 70 connected to the control network 40.

The frame transmitters 233-1 and 233-2 convert the control data requested to be transmitted from the application units 22-1 and 22-2-1 into a communication frame and transmit it to the virtual NICs 24-1 and 24-2-1. When detecting link-up of the virtual NICs 24-1 and 24-2-1 through a notification from the link state detectors 232-1 and 232-2, the frame transmitters 233-1 and 233-2 make various preparations to temporarily buffer new communication frames. When detecting link-down of the virtual NICs 24-1 and 24-2-1 through a notification from the link state detectors 232-1 and 232-2, the frame transmitters 233-1 and 233-2 discard the temporarily buffered communication frames and do not accept a new communication frame requested to be transmitted from the application units 22-1 and 22-2-1. In addition, the virtual NICs 24-1 and 24-2-1 discard a communication frame to be transmitted to a virtual L2SW 13-1. Note that this is a general operation of the NIC.

The virtualization unit 10 has a processing unit 11 including, for example, a VM configuration management unit 111, a VM state management unit 112, a VM state detector 113, a disconnection necessity confirmation unit 114, a control communication disconnection controller 115, a setting storage 12 and virtual L2SWs 13-1 and 13-2. However, it is not limited thereto. The processing unit 11 can include one or more virtual CPUs that can be mapped one-to-one to one or more physical Central Processing Units (CPU) included in the communication processing device 100, by using any virtualization technology, and can assign a virtual CPU for processing the virtual machines 20-1 and 20-2.

The VM configuration management unit 111 instructs to change the configuration of the virtual hardware, received from the VM state operation unit provided inside or outside the communication processing device 100, to the virtual machines 20-1 and 20-2. Examples of the inside include, for example, functions of the processing unit 11 not illustrated or the virtual machines 20-1 and 20-2, and the like. Examples of the outside include, for example, the external computer 70 and the like. Examples of the change of configuration of the virtual hardware include a change of the link state between the virtual NIC 24 and the virtual L2SW 13, and the like. Details will be described later, but the VM configuration management unit 111 links up or links down the virtual NICs 24-1 and 24-2-1 on the basis of the instruction from the control communication disconnection controller 115.

The VM state management unit 112 instructs to change the state of the virtual machines 20-1 and 20-2, received from the VN state operation unit provided inside or outside the communication processing device 100, to the virtual machines 20-1 and 20-2. Examples of the "state" include, power off, running, pause and the like. Examples of the "instruction to change" include start, pause, resumption, shutdown, and the like.

The VM state detector 113 inquiries the VM state management unit 112 about the state of the virtual machines 20-1 and 20-2 and notifies the disconnection necessity confirmation unit 114 of the detected state of the virtual machines 20-1 and 20-2. It is to be noted that the inquiries to the VM state management unit 112 are made periodically, for example, at a cycle of one second.

The disconnection necessity confirmation unit 114 calculates, on the basis of the state of the virtual machines 20-1 and 20-2 notified from the VM state detector 113, the time during which the virtual machines 20-1 and 20-2 keep the state. The disconnection necessity confirmation unit 114 notifies the control communication disconnection controller 115 on the basis of comparison between the calculated time and the setting time stored in the setting storage 12.

For example, when the virtual machine 20-1 is paused, the disconnection necessity confirmation unit 114 calculates the time after the virtual machine 20-1 is paused (hereinafter referred to as "stop duration") T1. When the stop duration T1 exceeds the setting time T1_TH, the disconnection necessity confirmation unit 114 notifies the control communication disconnection controller 115 of disconnection of control communication. When the stop duration T1 does not exceed the setting time T1_TH, the disconnection necessity confirmation unit 114 waits for a predetermined time. Note that "T1_TH" is a threshold of time (e.g., 20 sec.) during which the control communication unit 23-1 can allow the virtual machine 20-1 to pause, and can be set as appropriate according to the specification of the control communication. For example, in the case where it is considered that communication abnormality occurs if the control communication is delayed more than 20 seconds. T1_TH is set so that such a communication frame is not transmitted. This function can be OFF when "−1 sec." is set to T1_TH.

On the other hand, when the virtual machine 20-1 is resumed from pause and is in operation, the disconnection necessity confirmation unit 114 calculates the time after resumption of the virtual machine 20-1 (hereinafter referred to as "operation duration time") T2. If the operation duration time T2 exceeds the setting time T2_TH, the disconnection necessity confirmation unit 114 notifies the control communication disconnection controller 115 of a control communication disconnection release. If the operation duration time T2 does not exceed the setting time T2_TH, the disconnection necessity confirmation unit 114 waits for a predetermined time. The "T2_TH" is a threshold of time (e.g., 10 sec.) required for the control communication units 23-1 and 23-2 to go into the operation for reestablishing the control communication session, and is set as appropriate according to the processing time for linking down the guest OS 21-1 and the control communication unit 23-1. For example, T2_TH is set on the basis of the time (e.g., 10 sec.) required for the time from occurrence of link-down, detection of the link-down by the guest OS 21-1 and the control communication unit 23-1, discard of old communication frame and to completion of reestablishment of a communication channel. This function can be OFF when "−1 sec." is set to T2_TH.

The control communication disconnection controller 115 instructs the VM configuration management unit 111 on the basis of a notification from the disconnection necessity confirmation unit 114. For example, when the virtual machine 20-1 is paused, the control communication disconnection controller 115 instructs, upon reception of a control communication disconnection notification from the disconnection necessity confirmation unit 114, the VM configuration management unit 111 to link down the virtual NIC 24-1 of the virtual machine 20-1 paused. On the other hand, when the virtual machine 20-1 is resumed from pause, the control communication disconnection controller 115 instructs, upon reception of a control communication disconnection release notification from the disconnection necessity confirmation unit 114, the VM configuration management unit 111 to link up the virtual NIC 24-1 of the virtual machine 20-1 resumed.

The setting storage 12 stores the setting times T1_TH and T2_TH. It is to be noted that the setting storage 12 can include one or more virtual memories mapped one to one to one or more physical memories included in the communication processing device 100, by using any virtualization technology.

In other words, when the virtual machine 20-1 is paused, the processing unit 11 links down the virtual NIC 24-1 of the virtual machine 20-1 paused. Further, when the virtual machine 20-1 is resumed, the processing unit 11 links up the virtual NIC 24-1 of the virtual machine 20-1 resumed. It is to be noted that, it is preferable that the processing unit 11 links up after waiting for a predetermined time after resumption of the virtual machine 20-1.

(Communication Processing Method)

A processing example of the communication processing device 100 according to an embodiment will be described with reference to FIG. 2. This example corresponds to an embodiment of the communication processing method according to the present disclosure.

This processing example is started from the time at which the virtual machine 20-1 is paused, for example.

In step S100, when detecting a pause of the virtual machine 20-1 through an inquiry to the VM state management unit 112, the VM state detector 113 gives a pause notification to the disconnection necessity confirmation unit 114.

In step S102, when receiving the pause notification from the VM state detector 113, the disconnection necessity confirmation unit 114 calculates the stop duration T1 after pause of the virtual machine 20-1. Further, the disconnection necessity confirmation unit 114 acquires the setting time T1_TH from the setting storage 12. Subsequently, the disconnection necessity confirmation unit 114 compares the stop duration T1 with the setting time T1_TH. When the stop duration T1 exceeds the setting time T1_TH, the disconnection necessity confirmation unit 114 gives a control communication disconnection notification to the control communication disconnection controller 115. When the stop duration T1 does not exceed the setting time T1_TH, the disconnection necessity confirmation unit 114 waits for a predetermined time and repeats step S102.

In step S104, when receiving the control communication disconnection notification from the disconnection necessity confirmation unit 114, the control communication disconnection controller 115 instructs the VM configuration management unit 111 to link down the virtual NIC 24-1. When receiving an instruction from the control communication disconnection controller 115, the VM configuration management unit 111 links down the virtual NIC 24-1 of the virtual machine 20-1 paused Hereinafter, in this processing example, suppose the paused virtual machine 20-1 is resumed. According to this processing example, the virtual NIC 24-1 is linked down by the processing in step S104. Thus, even if the virtual machine 20-1 is resumed, communication frames that were in the process of being transmitted prior to pause of the virtual machine 20-1 will not be erroneously transmitted. Therefore, erroneous determination and erroneous operation on the control system can be prevented.

In step S106, the guest OS 21-1 detects that the virtual NIC 24-1 has been linked down by the general operation of the general-purpose OS such as Windows® or Linux®. The guest OS 21-1 discards the communication frames remained in a buffer of the guest OS 21-1 by disconnecting the logical communication channel that uses the linked down virtual NIC 24-1. It is to be noted that the time from resumption of the virtual machine 20-1 to the processing of step S106 is shorter than the setting time T2_TH.

In step S108, the link state detector 232-1 of the control communication unit 23-1 detects that the virtual NIC 24-1 has been linked down. The control communication unit 23-1 notifies the communication channel establishment unit 23-1-1 and the frame transmitter 233-1 of the link down of the virtual NIC 24-1. The communication channel establishment unit 23-1-1 releases an IP address and sets routing to disconnect a logical communication channel with the controllers 50-1 and 50-2 and the external computer 70 connected to the control network 40. On the other hand, the frame transmitter 233-1 discards the communication frame that has been temporarily buffered. It is to be noted that the time from resumption of the virtual machine 20-1 to processing of step S108 is shorter than the setting time T2_TH.

In step S109, the virtual NIC 24-1 discards a communication frame to be transmitted to the virtual L2SW 13-1 when linked down by the VM configuration management unit 111. It is to be noted that the time from resumption of the virtual machine 20-1 to the processing of step S109 is shorter than the setting time T2_TH.

In step S110, when detecting resumption of the virtual machine 20-1 through an inquiry to the VM state management unit 112, the VM state detector 113 notifies the disconnection necessity confirmation unit 114 of resumption. It is to be noted that resumption of the virtual machine 20-1 is determined by transition of the state of the virtual machine 20-1 from pause to in operation.

In step S112, when receiving a resumption notification from the VM state detector 113, the disconnection necessity confirmation unit 114 calculates the operation duration T2 after resumption of the virtual machine 20-1. Further, the disconnection necessity confirmation unit 114 acquires the setting time T2_TH from the setting storage 12. Subsequently, the disconnection necessity confirmation unit 114 compares the operation duration T2 with the setting time T2_TH. When the operation duration T2 exceeds the setting time T2_TH, the disconnection necessity confirmation unit 114 gives a control communication disconnection release notification to the control communication disconnection controller 115. When the operation duration T2 does not exceed the setting time T2_TH, the disconnection necessity confirmation unit 114 waits for a predetermined time and repeats step S112.

In step S114, when receiving the control communication disconnection release notification from the disconnection necessity confirmation unit 114, the control communication disconnection controller 115 instructs the VM configuration management unit Ill to link up the virtual NIC 24-1 of the virtual machine 20-1 resumed. When receiving the instruction from the control communication disconnection controller 115, the VM configuration management unit 111 links up the virtual NIC 24-1 of the virtual machine 20-1 resumed.

In step S116, when detecting link-up of the virtual NIC 24-1, the guest OS 21-1 resets network protocol stack such as duplicate IP addresses diagnosis.

In step S118, when detecting link-up of the virtual NIC 24-1, the link state detector 232-1 of the control communication unit 23-1 notifies the communication channel establishment unit 23-1-1 and the frame transmitter 233-1 of link-up of the virtual NIC 24-1. The communication channel establishment unit 23-1-1 performs duplicate IP addresses diagnosis, IP address assignment, routing setting, and the like, to establish a logical communication channel with the controllers 50-1 and 50-2 and the external computer 70 connected to the control network 40. The frame transmitter 233-1 makes various preparations to temporarily buffer new communication frames received from the application unit 22-1.

According to the present embodiment, even if the virtual machine 20-1 is paused and resumed, the guest OS 21-1 and the control communication unit 23-1 operated on the virtual machine 20-1 can indirectly detect that the virtual machine 20-1 has been paused and resumed by using the link-down function and link-up function of the virtual NIC 24-1. In this manner, even if the virtual machine 20-1 is resumed after pause, old communication frames that were in the process of being transmitted prior to pause of the virtual machine 20-1 are discarded, thus erroneous determination and erroneous operation on the control system can be prevented. Further, even if a new device with a duplicate IP address is added during the time between when the virtual machine 20-1 is paused and is resumed, the duplicate IP addresses diagnosis is performed, which allows for preventing the control communication from hindered. Further, in this embodiment, the virtual hardware exposed to the guest OS 21-1 etc. running on virtual machine 20-1 is the minimum in light of compatibility, which is useful in recent years in which improvement of inside the virtual machine 20-1 is not desired.

It is to be noted that the general-purpose communication processing device can be functioned as the communication processing device 100 according to the present disclosure. Specifically, it is possible that a program describing the processing contents that realize each function of the communication processing device 100 according to the present embodiment is stored in the memory of the general-purpose communication processing device, and that the program is read and executed by a processor of the general-purpose communication processing device.

Although the present disclosure has been described on the basis of the drawings and the embodiments, it is to be noted that various changes and modifications can be made easily by those who are ordinarily skilled in the art on the basis of the present disclosure. Accordingly, it is to be noted that such changes and modifications are included in the scope of the present disclosure. For example, functions and the like included in each step can be rearranged without logical inconsistency, and a plurality of steps can be combined into one or divided.

For example, with reference to FIG. 1, the virtual NIC24-2-2 that is not responsible for control communication but is responsible for general-purpose communication does not need to be linked down even if the virtual machine 20-2 is paused. On the other hand, the virtual NIC 24-2-1 that is responsible for control communication needs to be linked down when the virtual machine 20-2 is paused. Therefore, when the virtual machine 20-2 is paused, the disconnection necessity confirmation unit 114 may determine whether or not the virtual NICs 24-2-1 and 24-2-2 need to be linked down, by referring to the information, stored in the setting storage 12, for example, about whether or not the virtual machine 20-2 paused includes the virtual NIC 24-2-1 that needs to be linked down. When the disconnection necessity confirmation unit 114 determines that the virtual NIC 24-2-1 needs to be linked down, explanations of the description is referred for the following processing. In other words, the processing unit 11 links down and links up the virtual NIC 24-2-1 that is responsible for control communication. It is to be noted that the above information may be set as appropriate by an administrator of communication control system, or may be automatically created, additionally or alternatively, on the basis of whether or not the virtual machine 20-2 includes the virtual NIC 24-2-1 connected to the virtual L2SW 13-1 that is responsible for control communication.

Further, with reference to FIG. 1, for the virtual NIC24-2-1 that is responsible for control communication, the threshold of transition from link-up to link-down, or the threshold of transition from link-down to link-up may be set smaller than that of the virtual NIC24-2-2 that is responsible for general-purpose communication. For example, the threshold of the setting time T1_TH for the virtual NIC24-2-1 may be set smaller than the threshold of the setting time T1_TH for the virtual NIC24-2-2. In this case, the disconnection necessity confirmation unit 114 determines whether or not the virtual NICs 24-2-1 and 24-2-2 are linked down and/or linked up on the basis of the threshold.

Further, with reference to FIG. 1, when the virtual machines 20-1 and 20-2 simultaneously perform communication processing, transmission processing is concentrated on the physical NICs 30-1 and 30-2, resulting in an increased processing load of the virtualization unit 10. In this case, when the processing load of the virtualization unit 10 itself exceeds a predetermined threshold, the virtualization unit 10 may pause the virtual machines 20-1 and 20-2 for a time less than T1_TH before resumption. In this manner, concentration of transmission processing on the physical NICs 30-1 and 30-2 is suppressed. Further, since the virtual machines 20-1 and 20-2 are paused for less than T1_TH, communication frames that adversely affect control communication may not be transmitted. However, when the processing load of the virtualization unit 10 still exceeds the predetermined threshold, the virtualization unit 10 may pause the virtual machines 20-1 and 20-2 until the processing load of itself is decreased. It is to be noted that, when the virtual machines 20-1 and 20-2 are paused for T1_TH or more, as with the above described processing example, transmission of old communication frames may be prevented by linking down the virtual NIC 24-2-1 that is responsible for control communication. The processing load and the threshold may be a Central Processing Unit (CPU) load and 20%, respectively.

INDUSTRIAL APPLICABILITY

The present disclosure can provide a communication processing device, a program and a communication processing method that can prevent communication frames that were in the process of being transmitted prior to pause of a virtual machine from being transmitted by using the link-down function of the virtual NIC.

The invention claimed is:

1. A communication processing device comprising at least one physical processor for performing functions of a virtualization unit and a processing unit, wherein the virtualization unit provides operating environment in which a virtual machine operates;

the virtualization unit includes the processing unit and the virtual machine includes a virtual NIC;

when the virtual machine is paused, the processing unit waits for a first time after the virtual machine is paused, performs link-down to disable the virtual NIC of the virtual machine paused from communicating with other machines, and discards communication frames that are in process; and when the virtual machine is resumed, the processing unit waits for a second time which differs from the first time after the virtual machine is resumed, and performs link-up to enable the virtual NIC of the virtual machine resumed to communicate with other machines, wherein the virtual NIC discards the communication frames, and the time from resumption of the virtual machine to the discarding of the communication frames by the virtual NIC is shorter than the second time.

2. The communication processing device according to claim 1, wherein the processing unit performs the link-down to the virtual NIC that is responsible for control communication.

3. The communication processing device according to claim 1, wherein, the processing unit performs the link-up to the virtual NIC that is responsible for control communication.

4. The communication processing device according to claim 1, wherein when the virtual machine is paused, the processing unit performs link-down to a predetermined virtual NIC among a plurality of virtual NIC of the virtual machine.

5. The communication processing device according to claim 1, wherein when the virtual machine is resumed, the processing unit performs link-up to a predetermined virtual NIC among a plurality of NIC of the virtual machine.

6. A non-transitory computer readable medium including a computer program instruction configured to cause a computer to function as a communication processing device according to claim 1.

7. A communication processing method using a communication processing device comprising at least one physical processor in which a virtual machine operates, the method comprising:

determining that the virtual machine is paused:

in response to determining that the virtual machine is paused, waiting for a first time after the virtual machine is paused, performing link-down to disable a virtual NIC of the virtual machine paused from communicating with other machines, and discarding communication frames that are in process;

resuming the virtual machine; and in response to resuming the virtual machine, waiting for a second time which differs from the first time after the virtual machine is resumed, and performing link-up to enable the virtual NIC of the virtual machine resumed to communicate with other machines, wherein the virtual NIC discards the communication frames, and the time from resumption of the virtual machine to the discarding of the communication frames by the virtual NIC is shorter than the second time.

* * * * *